US008612296B2

(12) United States Patent
Wiesehuegel et al.

(10) Patent No.: US 8,612,296 B2
(45) Date of Patent: *Dec. 17, 2013

(54) READ-ONLY USER ACCESS FOR WEB BASED AUCTION

(75) Inventors: Leland James Wiesehuegel, Austin, TX (US); Rebecca Lynn Roberts, Austin, TX (US); William James Morrison, Gilmanton, NH (US); Jacob Marvin Rzepka, Round Rock, TX (US)

(73) Assignee: eBay Inc., San Jose, CA (US)

( * ) Notice: Subject to any disclaimer, the term of this patent is extended or adjusted under 35 U.S.C. 154(b) by 929 days.

This patent is subject to a terminal disclaimer.

(21) Appl. No.: 12/243,410

(22) Filed: Oct. 1, 2008

(65) Prior Publication Data

US 2009/0030813 A1 Jan. 29, 2009

Related U.S. Application Data

(63) Continuation of application No. 09/801,613, filed on Mar. 8, 2001, now Pat. No. 7,475,025.

(51) Int. Cl.
*G06Q 30/00* (2006.01)

(52) U.S. Cl.
USPC .................................. 705/26; 705/27; 705/37

(58) Field of Classification Search
USPC ................................................ 705/26, 37, 27
See application file for complete search history.

(56) References Cited

U.S. PATENT DOCUMENTS

| | | | |
|---|---|---|---|
| 4,799,156 A | 1/1989 | Shavit et al. | |
| 4,984,155 A | 1/1991 | Geier et al. | |
| 5,117,354 A | 5/1992 | Long et al. | |
| 5,117,355 A | 5/1992 | McCarthy | |
| 5,136,501 A | 8/1992 | Silverman et al. | |
| 5,154,738 A | 10/1992 | Armstrong | |
| 5,303,379 A | 4/1994 | Khoyi et al. | |

(Continued)

FOREIGN PATENT DOCUMENTS

| US | WO 00/39735 | 7/2000 |
|---|---|---|
| WO | WO 00/39735 | 7/2000 |

OTHER PUBLICATIONS

Unisys Announces Its Strategic Service Partnership Program, Giving Computer Industry OEMs Access to Its Entire Portfolio of Distributed Computing Support Services, Business Editors. Business Wire. New York: May 4, 1998. p. 1, downloaded from ProQuest on the Internet on Mar. 26, 2008 and in parent U.S. Appl. No. 09/801,613.*

(Continued)

*Primary Examiner* — James Zurita
(74) *Attorney, Agent, or Firm* — Haynes and Boone LLP

(57) ABSTRACT

A networked computer arrangement and method in which a manufacturer or service provider may communicate to a plurality of traders the items, including goods and/or services, which may be available for purchase, the quantities of those available items, and any other conditions to be met for the purchase of the available items. Traders may apply guest bidder profiles or entitlement schema to the available goods lists to produce offerings for a plurality of guest brokers. Only bid-relevant product information is presented to each guest broker as needed in order to protect the offering party's overall position on the offered good(s). Guest broker profiles or entitlement schema may be based on perspective contractual arrangements between potential brokers, traders, and a manufacturer or service provider. Offerings are presented to the guest brokers, who are restricted from participating in the bidding process.

8 Claims, 6 Drawing Sheets

(56) References Cited

U.S. PATENT DOCUMENTS

| | | | |
|---|---|---|---|
| 5,319,542 A | 6/1994 | King et al. | |
| 5,424,944 A | 6/1995 | Kelly et al. | |
| 5,640,569 A | 6/1997 | Miller et al. | |
| 5,799,157 A | 8/1998 | Escallon | |
| 5,835,896 A | 11/1998 | Fisher et al. | |
| 5,870,719 A | 2/1999 | Maritzen et al. | |
| 5,897,639 A | 4/1999 | Greef et al. | |
| 5,924,083 A | 7/1999 | Silverman et al. | |
| 5,950,173 A | 9/1999 | Perkowski | |
| 5,999,915 A | 12/1999 | Nahan et al. | |
| 6,006,201 A | 12/1999 | Berent et al. | |
| 6,012,045 A | 1/2000 | Barzilai | |
| 6,023,686 A | 2/2000 | Brown | |
| 6,029,160 A | 2/2000 | Cabrera et al. | |
| 6,032,145 A | 2/2000 | Beall et al. | |
| 6,044,363 A | 3/2000 | Mori et al. | |
| 6,055,518 A | 4/2000 | Franklin et al. | |
| 6,058,379 A | 5/2000 | Odom et al. | |
| 6,085,169 A | 7/2000 | Walker et al. | |
| 6,108,639 A | 8/2000 | Walker et al. | |
| 6,131,087 A | 10/2000 | Luke et al. | |
| 6,134,534 A | 10/2000 | Walker et al. | |
| 6,147,686 A | 11/2000 | Brown et al. | |
| 6,161,099 A | 12/2000 | Harrington et al. | |
| 6,173,377 B1 | 1/2001 | Yanai et al. | |
| 6,199,048 B1 | 3/2001 | Hudetz et al. | |
| 6,199,050 B1 | 3/2001 | Alaia et al. | |
| 6,216,114 B1 | 4/2001 | Alaia et al. | |
| 6,272,472 B1 | 8/2001 | Danneels et al. | |
| 6,389,402 B1 | 5/2002 | Ginter et al. | |
| 6,415,269 B1 | 7/2002 | Dinwoodie | |
| 6,449,601 B1 | 9/2002 | Friedland | |
| 6,453,325 B1 | 9/2002 | Cabrera et al. | |
| 6,484,153 B1 | 11/2002 | Walker et al. | |
| 6,505,172 B1 | 1/2003 | Johnson et al. | |
| 6,532,481 B1 | 3/2003 | Fassett, Jr. | |
| 6,535,880 B1 | 3/2003 | Musgrove et al. | |
| 6,564,192 B1 | 5/2003 | Kinney et al. | |
| 6,598,029 B1 | 7/2003 | Johnson et al. | |
| 6,606,603 B1 | 8/2003 | Joseph et al. | |
| 6,985,885 B1 | 1/2006 | Goldberg et al. | |
| 7,031,943 B1 * | 4/2006 | James et al. | 705/59 |
| 7,475,009 B2 | 1/2009 | Ishikura | |
| 7,475,025 B2 | 1/2009 | Wiesehuegel et al. | |
| 7,702,560 B1 | 4/2010 | Wiesehuegel et al. | |
| 7,801,793 B2 | 9/2010 | Wiesehuegel et al. | |
| 7,865,420 B1 * | 1/2011 | Daman et al. | 705/37 |
| 2001/0027431 A1 | 10/2001 | Rupp et al. | |
| 2001/0032162 A1 | 10/2001 | Alsberg et al. | |
| 2001/0047308 A1 | 11/2001 | Kaminsky et al. | |
| 2002/0004753 A1 | 1/2002 | Perkowski | |
| 2002/0007318 A1 | 1/2002 | Alnwick | |
| 2002/0038282 A1 | 3/2002 | Montgomery | |
| 2002/0059131 A1 * | 5/2002 | Goodwin et al. | 705/37 |
| 2002/0059132 A1 | 5/2002 | Quay et al. | |
| 2002/0065760 A1 | 5/2002 | Wiesehuegel et al. | |
| 2002/0082953 A1 | 6/2002 | Batham et al. | |
| 2002/0103721 A1 | 8/2002 | Wiesehuegel et al. | |
| 2002/0128948 A1 | 9/2002 | Wiesehuegel et al. | |
| 2002/0184084 A1 | 12/2002 | Lidow | |
| 2003/0009392 A1 | 1/2003 | Perkowski | |
| 2003/0051068 A1 | 3/2003 | Eldridge et al. | |
| 2003/0083983 A1 | 5/2003 | Fisher et al. | |
| 2005/0234811 A1 | 10/2005 | Herman et al. | |
| 2007/0055615 A1 | 3/2007 | Howell et al. | |

OTHER PUBLICATIONS

United States Patent and Trademark Office; Notice of Allowance dated Mar. 8, 2010 in related U.S. Appl. No. 09/821,106, filed Mar. 29, 2001, Leland James Wiesehuegel.

Heller, Richard; "Online: Make a name for yourself on the net: As new countries get their internet domains, it opens up a whole new world for astute dealers in company titles", The Guardian, Manchester (UK): Oct 26, 2000. p. 12.

USPTO; Notice of Allowance in U.S. Appl. No. 09/726,009, filed Nov. 29, 2000, by Leland James Wiesehuegel.

USPTO; Notice of Allowance in U.S. Appl. No. 09/726,009, filed Nov. 29, 2000.

PurchasePro.com, Inc. Reports 109 Percent Sequential Revenue Growth for the Second Quarter of Fiscal 2000; [1] Business Editors.

Schwing, H. James, "Regulation of the U.S. secondary mortgage market", Housing Finance International, Sep. 1, 2001, published online by AllBusiness of San Francisco, CA, USA, downloaded from http://www.allbusiness/finance-insurance/credit-intermdiation-related/103-0102-1.html on Jan. 25, 2008.

Leszczyc, Peter T.L., and Gerald Haubl, Abstract of "Bidding Frenzy: Intensity of Competitive Interaction Among Bidders and Product Valuation in Auctions", see especially pp. 5-6. Retrieved on Jun. 25, 2008 from: www.business.ualberta.ca/ppopkowski/Papers/ACR%20SPECIAL%20SESSION%20SUMMARY.doc. Also available at http://www.acrwebsite.org/volumes/display.asp?id=7910 published in "Advances in Consumer Research", vol. 28, 2001, pp. 451-453.

Milgrom, Paul; "Putting Auction Theory to Work: The Simultaneous Ascending Auction"; see especially p. 4 lines 4-5 and p. 12 lines 30-38; retrieved on Jun. 25, 2008 from: http://www-econ.stanford.edu/faculty/workp/swp98002.pdf.

U.S. Appl. No. 60/224,240.

Unisys Announces Its Strategic Service Partnership Program, Giving Computer Industry OEMs Access to Its Entire Portfolio of Distributed Computing Support Services, Business Editors. Business Wire. New York: May 4, 1998, p. 1, downloaded from ProQuest on the Internet on Mar. 26, 2008.

Definition of "proxy" and "proxy server", Microsoft Computer Dictionary, 5th Edition, 2002, p. 428.

USPTO; Recent Examination Correspondence from a Related U.S. Appl. No. 09/714,726, filed Nov. 16, 2000 by Leland James Wiesehuegel.

USPTO; Recent Examination Correspondence from a Related U.S. Appl. No. 09/726,009, filed Nov. 29, 2000 by Leland James Wiesehuegel.

USPTO; Recent Examination Correspondence from a Related U.S. Appl. No. 09/773,197, filed Jan. 31, 2001 by Leland James Wiesehuegel.

USPTO; Recent Examination Correspondence from a Related U.S. Appl. No. 09/801,613, filed Jan. 6, 2009 by Leland James Wiesehuegel.

USPTO; Recent Examination Correspondence from a Related U.S. Appl. No. 09/801,604, filed Mar. 8, 2001 by Leland James Wiesehuegel.

USPTO; Examination Correspondence from a Related U.S. Appl. No. 09/821,106, filed Sep. 21, 2010 by Leland James Wiesehuegel.

ILS BidQuest Clears Million-Dollar Mark; ILS Auction List Exceeds Six-Thousand Items PR Newswire. New York: Nov. 7, 2000. p. 1.

Ariba: Ariba Sourcing now available; Function-rich platform introduces RFQ-based procurement along commerce services network with enterprise and marketplace editions M2 Presswire. Coventry: Sep. 12, 2000. p. 1.

PurchasePro.com, Inc. Reports 109 Percent Sequential Revenue Growth for the Second Quarter of Fiscal 2000; [1] Business Editors. Business Wire. New York: Jul. 19, 2000. p. 1.

USPTO; Examination Correspondence from a Related U.S. Appl. No. 09/714,726, filed Nov. 16, 2000 by Leland James Wiesehuegel.

USPTO; Examination Correspondence from a Related U.S. Appl. No. 09/773,197, filed Jan. 31, 2001 by Leland James Wiesehuegel.

USPTO; Examination Correspondence from a Related U.S. Appl. No. 09/801,604, filed Mar. 8, 2001 by Leland James Wiesehuegel.

* cited by examiner

Enhanced Broker Profile Matrix

|  | Category 1 | Category 2 | Category 3 | ••• | Category Y |
|---|---|---|---|---|---|
| Location 1 | YR | YR | N | | YR |
| Location 2 | N | N | N | | N |
| Location 3 | YR | N | N | | N |
| ⋮ | | | | | |
| Location X | N | N | N | | N |

READ-ONLY USER ACCESS FOR WEB BASED AUCTION

CROSS-REFERENCE TO RELATED APPLICATIONS (CLAIMING BENEFIT UNDER 35 U.S.C. 120)

This application is a continuation of U.S. patent application Ser. No. 09/801,613, filed on Mar. 8, 2001 now U.S. Pat. No. 7,475,025, now under allowance, which was related to U.S. application Ser. No. 09/714,726, filed on Nov. 16, 2000, filed by Leland James Wiesehuegel, et al.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

This application incorporates by reference U.S. patent application Ser. No. 09/801,613, filed on Mar. 8, 2001, and U.S. application Ser. No. 09/714,726, filed on Nov. 16, 2000, filed by Leland James Wiesehuegel, et al., in their entireties including drawings and figures.

BACKGROUND OF THE INVENTION

1. Field of the Invention

This application is a continuation of U.S. patent application Ser. No. 09/801,613, filed on Mar. 8, 2001, now under allowance, which was related to U.S. application Ser. No. 09/714,726, filed on Nov. 16, 2000, filed by Leland James Wiesehuegel, et al.

The present invention relates generally to electronic commerce and more particularly to conducting an interactive offer and bid collection over a computer network. The present invention relates especially to access by guest members to online auctions and offering systems which allow the guest to view offered products and restricts the guests activities such that he or she may not actually participate in the bidding process.

2. Description of the Related Art

Prior to the advent of electronic auctioning over computer networks or electronic commerce, auctions were held in a group of gathered bidders with an auctioneer. As shown in FIG. 1, an auction (1) is conducted on behalf of a seller (2) by an auctioneer (4). The auctioneer receives a list of items to be sold and possibly a minimum and/or reserve price for those items. During the auction, a plurality of bidders (6) place bids (5) under the guidance and control of the auctioneer (4). In some cases, multiple bidders (9) may pool (8) their bids, and the pooled bids (7) are submitted as a single bid with a combined quantity to the auctioneer (4).

The auctioneer enforces the rules of the auction, such as minimum bid price and quantities, minimum bid incrementing from the previous bid for a new bid, and time limits for placing bids. Auction bidders are typically qualified as to their ability to complete the purchase should their bid be the winning bid prior to entering the auction room.

Many online auctioning systems such as "priceline.com" have become very popular for individuals and businesses to use to take advantage of auctions at which they cannot be physically present. Such e-commerce auctions or online auctions are usually conducted over a specified period of time of opening and closing for bids, and are typically conducted under one of several well-known sets of rules or models. These common models include "Dutch" auctions, progressive auctions, "Yankee" auctions, single-bid auction, sealed bid auctions, reserve auctions, and hybrids of these types of auctions.

However, most sales offering and bid systems conducted by manufacturers of goods or service providers are conducted under a different set of procedures and processes. Turning to FIG. 2, a typical trader and broker system for offering and accepting bids is shown (20). In such a business-to-business ("B2B") offering and bidding process (20), a manufacturer or service provider (21) will notify one or more traders (24) of available products or services, quantities, and minimum acceptable bid values (22). The trader then provides offerings (23') to one or more brokers (25), to which the brokers may respond with bids (23).

In some cases, bids may be accepted for either partial lots or whole lots of offered products. These offerings (23') and the corresponding bids (23) are collected by the trader, and the trader (24) makes a decision of which bids to accept. The traders (24) subsequently respond to the manufacturer or service provider (21) with actual orders or purchases (22).

Although the B2B offering and bid acceptance process may be conducted similarly to an auction, it is not an auction in the strict sense in that the order fulfillment, or bid acceptance, process is conducted usually by the trader at his discretion. For example, under a typical auction process, the highest qualified bidder may be defined as the bid winner. However, in a B2B offering and bid collection system, the trader may favor the second or third highest bid over the highest bid for the fact that the broker placing the second or third highest bid has preferred business arrangements, such as a longer history of purchasing from the trader or a history of larger volume purchases with the trader.

Brokers typically buy on speculation, and sell to end users. Brokers may sell to multiple retailers of products or services, or they may represent a single large retailer of a product or service.

Traders are typically commissioned sales professionals, and the structure of their commissions may vary depending on the quantities and the commodities or category of products being sold.

According to industry terminology, "Reseller Master Agreements" usually govern what a broker may purchase, which are enforced by the individual traders. For example, a particular broker may only have rights to purchase given commodities or categories of products within a certain geographical zone or region as defined by his Reseller Master Agreement with the manufacturer or service provider.

Further, traders may be restricted to handling specific commodities or categories of products and also may be restricted to certain localities. For example, a trader may specialize in furniture from a particular manufacturer, and may not be authorized to handle carpets or other textiles from the same manufacturer. This trader's expertise in furniture allows him to focus his knowledge and understanding into the market place for furniture. A trader may also be restricted as to the locality or geographical region in which his brokers may purchase goods, such as Europe, North America, or even more specific such as a particular state or city.

Thus, a particular broker may receive offers from multiple traders who represent a particular manufacturer or service provider. For example, a broker that represents a chain of computer stores may receive computer memory offers from a first broker, software upgrade offers from a second broker, and peripheral offers from yet a third broker, all of whom represent the same manufacturer. In response, this broker may bid for products or services in different categories, and must submit those bids to different traders based on the traders' commodities or categories of products that each trader handles.

As such, it is desirable not to present information to the traders or brokers which is irrelevant to the products or commodities for which they are entitled to purchase under their Reseller Master Agreement. For example, certain brokers and traders may be associated with geographical regions which are not allowed to receive certain products or services from the manufacturer because of regulatory or export controls. Additionally, certain contractual restrictions between the manufacturer and the trader or other traders and other brokers may establish territorial boundaries regarding products and services handled by the brokers and traders. Further, even though a broker may be entitled to receive offers for a particular product or service, it may not be desirable to indicate to that broker the total quantity available from the manufacturer, as having this knowledge may not encourage the broker to place his highest possible bid for the product or service.

Therefore, the available online auctioning systems are not appropriate in such B2B offering and bid collection systems. First, the available online auctioning systems represent a full auction under which certain rules dictate which bids will be automatically accepted so the system provides offering of available quantities, bid collection, bid rule enforcement, bid fulfillment, and bid acceptance functions under the rules of the auction. But, as previously discussed, B2B offerings and bid collections are not executed under such strict rules. Further, the available online auction systems are particularly adapted to placement of orders by multiples of bidders or pooled bidders, and do not favor the traditional interaction between traders and brokers. And, most online auctioning systems provide information as to last top bid ("bid to beat") and total quantities of goods available.

As such, the available online auction systems do not allow for the restriction and filtering of information which is conveyed from the offering party to the offered party to eliminate the presentation of information which is not relevant to the offered party's Reseller Master Agreement. This may not protect the confidentiality of total quantities available from the offering party, and may compromise the ability of the offering party to obtain the best possible bids for the goods offered.

The related application discloses a system and method which provides an online capability to conduct both auctions and business-to-business sales offerings. Under this system and method, each potential bidder is associated with a profile matrix or entitlement schema. The broker's profile or bidder's profile indicates which materials from the master list of available materials are to be presented to the broker or bidder. This system therefore allows each bidder or broker to access and review only materials from the master list for which they are entitled to bid.

Potential bidders and brokers, however, who have not joined into the auction or offering process, such as those who have not formally executed a Reseller Master Agreement ("RSA"), are not able to view available goods information as a "guest" due to the restrictions of the system described in the related application. Therefore, there is a need in the art for these potential bidders to visit the online offering system or auction system to experience the capabilities of the system in how it functions with limited capabilities as a "guest" user.

In one possible embodiment, a guest bidder may be allowed to view a set of hypothetical information and products for availability. However, this is less desirable than allowing the user to view actually available products because the set of hypothetical available items may or may not be relevant to the items which the bidder would like to purchase. For example, a hypothetical set of items to be viewed by a potential bidder may include computers and memory. But, the potential bidder may be more interested in purchasing printers and hard disk drives. So, to use hypothetical data sets would mean to either create multiple data sets so that the examples given to the guest bidders are more relevant, or to accept the short comings of the hypothetical data sets approach.

Another approach to solving this problem of allowing potential bidders to participate or experience the auction functions is the method provided by eBay™. eBay allows a potential user to browse any and all available items, seeing both the listed bids and posted prices. However, there is no restriction as to the information that can be viewed according to the categories, regions, or themes of the offered items, and as such a potential bidder may see any and all of the available items. This may be undesirable both from the guest's perspective and the online offering system operator's perspective.

Therefore, there is a need in the art for a system and method which provides for delivery of authorized or entitled information regarding available items for a potential or guest bidder. This system preferably should provide the ability to establish a bidder profile which determines which available products are entitled to be viewed by the guest bidder. Then, upon visiting the online offering or auction system, the guest bidder would be allowed to see only product information for which he is entitled, and he would be prevented from actually taking part in the offering or auction process such as placing a bid.

BRIEF DESCRIPTION OF THE DRAWINGS

The following detailed description when taken in conjunction with the figures presented herein provide a complete disclosure of the invention.

SUMMARY OF THE INVENTION

Figure 1:
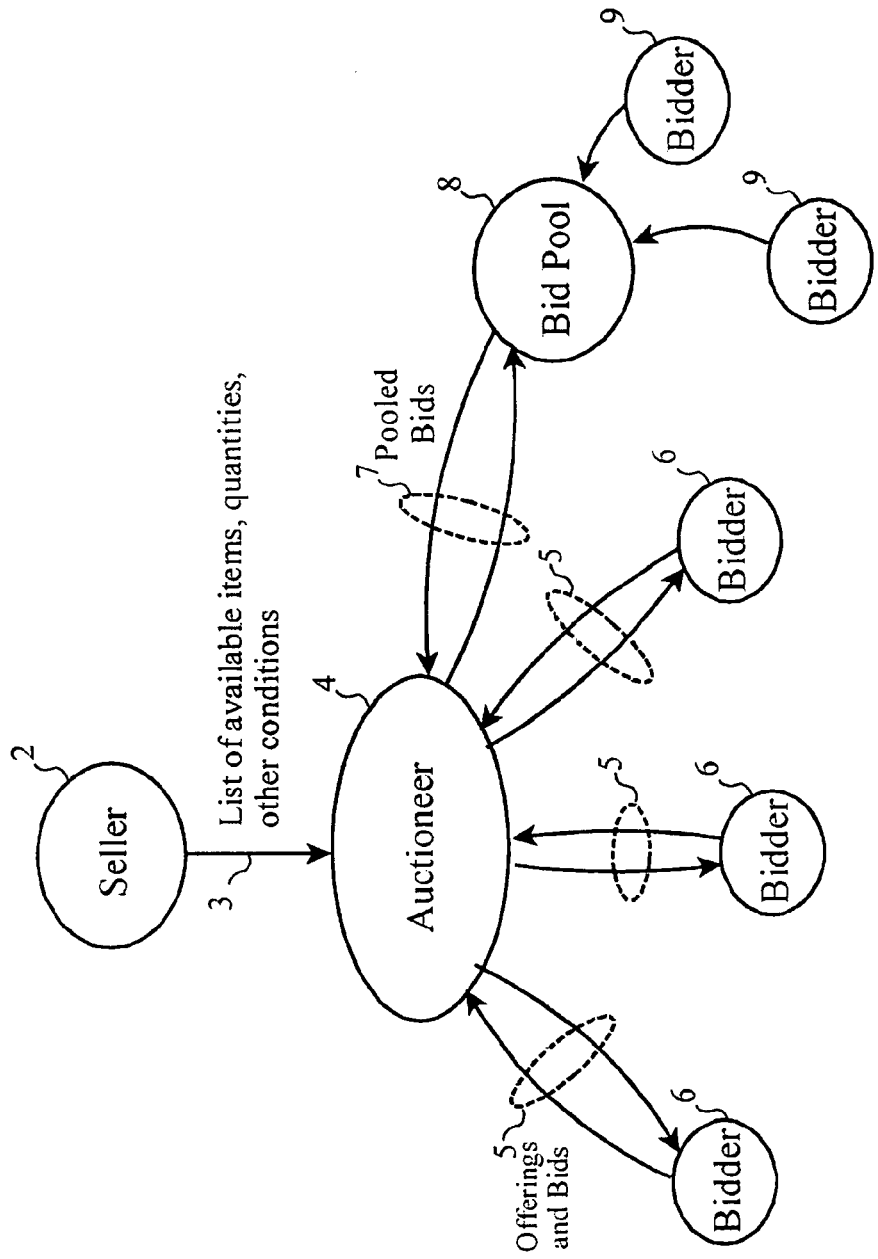
FIG. 1 discloses the well-known arrangement of sellers, auctioneers, and bidders.
Figure 2:
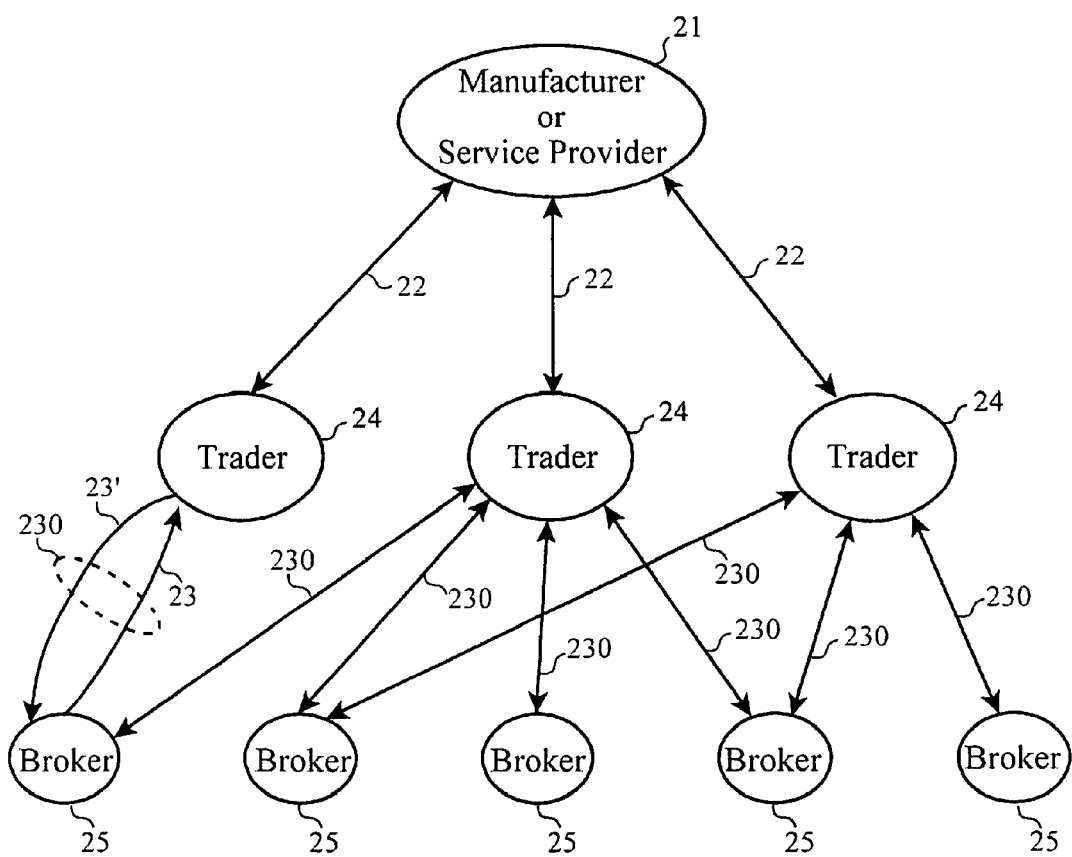
FIG. 2 shows the common business arrangement between manufacturers, service providers, traders, and brokers.

In order to address the aforementioned needs in the art, the present invention provides a networked computer arrangement and method in which a manufacture or service provider may communicate to a plurality of traders the goods or services which may be available, the quantities of those available goods, and any other conditions to be met by bidders or brokers.

Throughout the disclosure given herein and the following claims, the term "broker" is used to describe a bidding party or bidder, and the term "trader" is used to describe a party who conducts the process of promoting offers to bidding parties. This is nearly analogous to bidder and auctioneer in the context of a traditional auction, respectively, although the offering and bidding process provided by the invention may be used to conduct business-to-business offers as well as traditional types of auctions.

The system and method allows the traders to apply broker profiles or entitlement schema to those available goods lists to produce offerings for a plurality of bidders or brokers. Typically, the broker profiles or entitlement schema are based on the contractual arrangement between the brokers, the traders, and the manufacturer or service provider.

The system and method presents the prepared offerings to the brokers, who may submit bids in response to the offerings. The system and method allows the trader to review the collected bids from the broker, and to advance those bids for acceptance either through another order fulfillment system, or through manual confirmation of acceptance of the bid.

The system is particularly well-adapted for use over the Internet, intranets, and extranets, by allowing common computer web browsers, network terminals, and wireless web browsers to be used as the offering and bidding consoles by the traders and brokers, respectively, and by allowing the manufacturer or service provider to produce the lists of available products or services using common web technologies.

Specific offerings of materials or services are characterized by a location and product category pair of parameters. Brokers are assigned profiles of one or more location and category parameter pairs for which they are entitled to receive offers and on which they are entitled to bid.

The system provides the ability for the trader to retrieve lists of available items and their offering parameters from the manufacturer or service provider, and to produce offerings for view by their brokers. According to the disclosure of the related patent application, the brokers may retrieve their offerings from the system and may respond with independent bids. The independent bids are collected by the system and made available to the trader for review and subsequent acceptance.

According to the present invention, an enhancement is added to this base offering system which allows the potential or guest bidder or broker to have a read-only profile established for him or her. In this case, the operation is similar to that of the system and method of the related application in that the guest bidder receives only information about available products to which he or she is entitled according to his profile matrix, but also all responding and bidding actions are disabled. As such, he or she may experience the functionality of the online offering or auction system without being allowed to participate in the bidding process.

DETAILED DESCRIPTION OF THE INVENTION

The present method and system is preferably realized in a plurality of networked computers, including computer network terminals or consoles, networked database application servers, web servers, and a computer network. The computer network consoles employed are any suitable device for accessing remote application services over a computer network, including, but not limited to, personal computer-based web browsers, wireless web browsers such as web-enabled wireless telephones and personal digital assistants ("PDA"), Internet appliances, as well as dedicated computer terminals. The database application servers employable in the invention may be any of a wide array of available database application servers, including, but not limited to, IBM Lotus Notes servers, Oracle servers, etc.

The web servers incorporated into the invention may be any suitable platform, including, but not limited to, IBM's Web Sphere product, Apache Hyper Text Transfer Protocol ("HTTP") servers, secure HTTP servers ("HTTPS"), and the like. The computer network may include the Internet, intranets, extranets, dedicated networks such as local area networks ("LAN") and wide area networks ("WAN"), wireless data networks, and/or any other suitable computer and data communications network.

Communications means between database application servers, computer network consoles, and web servers may include any suitable data communications protocols and media including, but not limited to, dial-up modems over telephone lines, wireless data transceivers, cable modems, Digital Subscriber Lines ("DSL"), and dedicated data communication lines.

It will be recognized by those skilled in the art that certain combinations and integrations of the features presented herein may be made without departing from the spirit and scope of the invention. Further, it will be recognized that many of the architectural details disclosed herein are disclosed under the inventor's preferred embodiment in order to enhance the robustness and reliability of the invention, but these details may not be necessary to realize the fundamental functionality of the invention.

Figures 3, 4:
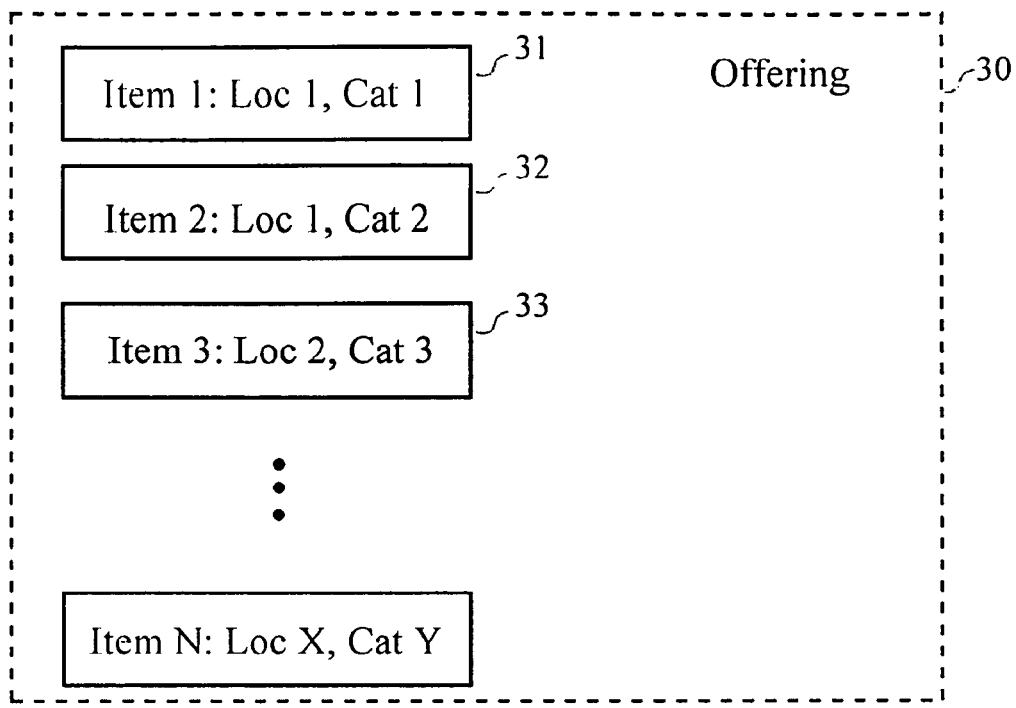
FIG. 3 shows the structure of offerings under the preferred embodiment.
FIG. 4 shows a broker profile matrix including a "read only" parameter for each "entitled" location and category pair.

Turning to FIG. 3, broker offerings (30) are comprised of one or more sets of materials (or services) associated with location and category code pairs. Typically, locations are related to geographical zones or regions such as countries, continents, or sales regions. Categories are typically related to products, product lines, or services such as computers, hard drives, monitors, minutes of long-distance, megabytes of transmission or other types of services and products. As such, an offering (30) which is presented to a broker contains only materials or services which are being made available to that broker for which the location and category code meet his broker profile. And, the offering may include materials for a combination of brokers. For example as shown in FIG. 3, an offering to a European broker may be comprised of a first material code pair such as location=Europe, and category=power supply, (31). It may also include additional materials with associated location and category pairs, such as location=Europe and category=computer_monitor, and location=Germany and category=Deutsche_AIX_operating system.

An enhanced broker profile matrix (40) according to the present invention is disclosed in FIG. 4. For each broker, a broker profile matrix is defined, which is a two-dimensional table for location and category in this preferred embodiment. It will be recognized, however, by those skilled in the art that such a broker profile matrix may be multidimensional beyond the two-dimensional example shown, or it may be single dimensional.

In this example of FIG. 4, the locations are indexed against the plurality of categories, and then a logical enabler, such as a Boolean flag, is recorded for each combination of location and category pairs. A profile matrix defines the "entitlement" for a particular broker. Available products or services which match the location-category parameter pairs in a broker's entitlement profile matrix are made available to that broker, and products and services which do not meet the parameters of the profile matrix are not presented for bidding to that broker. A special flag value, shown here as "YR", indicates that the broker or bidder is entitled to receive offering information for this location-category pair, but that the broker or bidder is not entitled to bid on those items (e.g. "Yes, Read Only"). A simple flag of "Y" indicates full privileges for viewing and bidding on products in the indicated location-category pair, and a flag of "N" indicates no privilege to see or bid on items in the indicated location-category pair.

For example in FIG. 4, the completed profile matrix for a hypothetical broker defines that the broker is entitled to receive offerings information but not to bid for category_1 products in location_1 and location_3, and for category_2 products only in location_1, and for category_Y products only in location_1. The hypothetical broker of this example is not authorized or entitled to receive offerings for any other location-category parameter pair.

Using this method, a currently-entitled bidder or broker can be defined as a "guest" for additional location-category pairs if the bidder or broker is considering executing an amended RMA to include those items, as well as allowing for guests who do not currently have any entitled location category pairs. In other words, a current bidder or broker may be enabled to see information about certain offers and bid on those offers having a "Y" for those offers in his profile, while he may be restricted to viewing information about other offers having a "YR" for those other offers in his profile.

Figure 5:
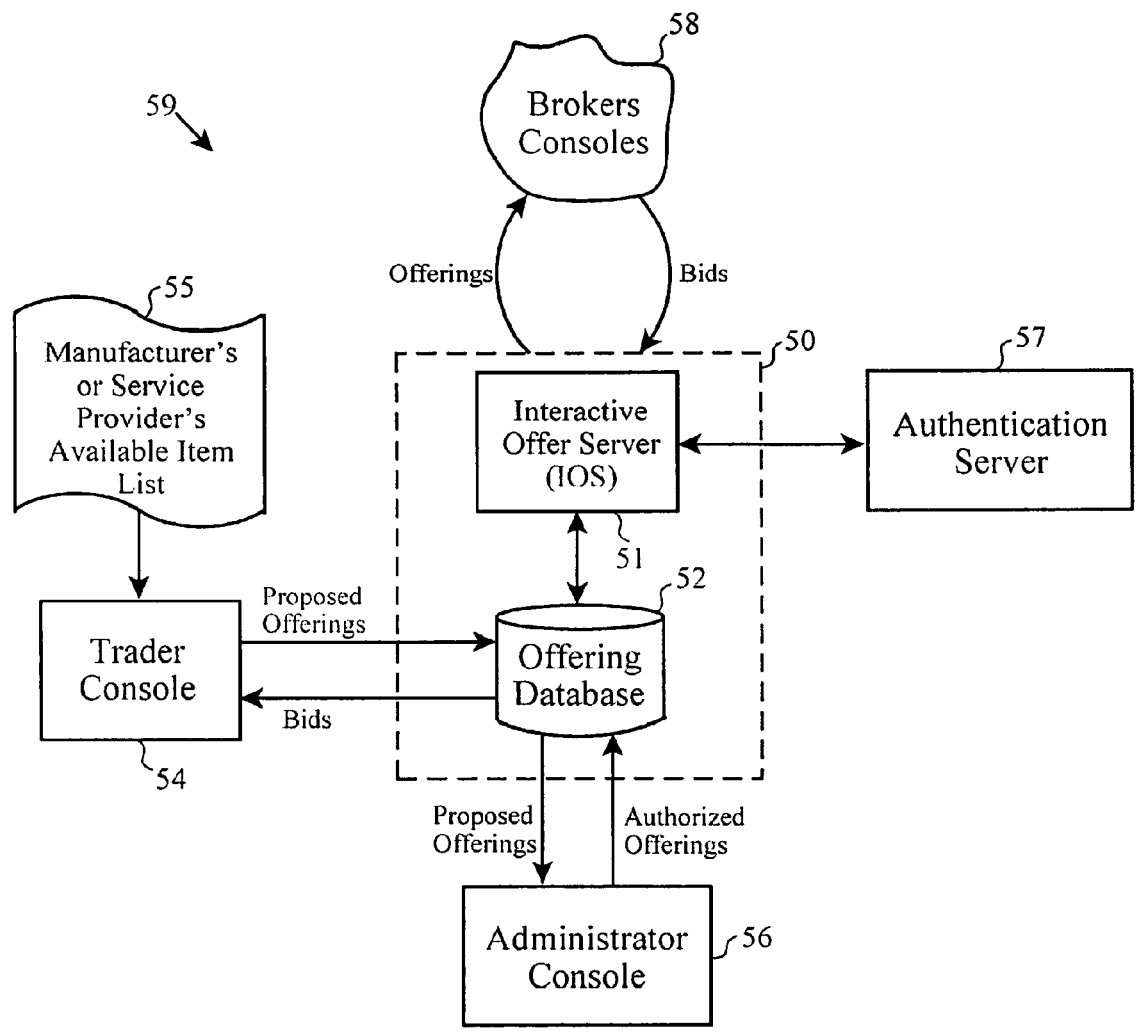
FIG. 5 shows a generalized system architecture of the invention.

Turning to FIG. 5 in which the general architecture of the system of the invention is shown, the Interactive Offer Server ("IOS") (51) is associated with an offering database (52). The offering system (50) is included in the larger architecture (59) which includes the brokers' consoles (58), the administrator console (56), and the traders' consoles (54). All consoles and the interactive offering server may communicate either as an integrated package within one computer system, or as separate computer systems integrated and communicating over a computer network such as the internet.

In the general architecture of FIG. 5, the manufacturer or service provider's goods availability list (55) is received by the trader consoles (54). The trader then creates proposed offerings by filtering the availability list against the broker profile matrices (40) for his broker(s). Those proposed offerings are input into the offering data base (52), which are then retrieved by the administrator using his administrator console (56).

The administrator then authorizes the proposed offerings and makes a note or change in the offering data base records to indicate such authorization.

During the open bidding process, the brokers may use their consoles, such as web browser personal computers (58), to retrieve their offerings, and to submit bids via the IOS (51). When a broker makes contact with the interactive offering server, his identity is first verified by an Authentication Server (57), according to the preferred embodiment.

In response to the broker's request for products or services offerings, the IOS queries the offering database (52) and presents the broker with offerings which contain items to which he or she is entitled. An authentication server (57) is included in the preferred embodiment so as to allow the interactive offering server to authenticate the broker prior to presenting any offerings to the broker. As such, the general architecture (59) as shown in FIG. 5 provides each broker with one or more offerings which have been authorized and which have been filtered only to show available materials or services on which he is entitled to bid or view.

Figure 6:
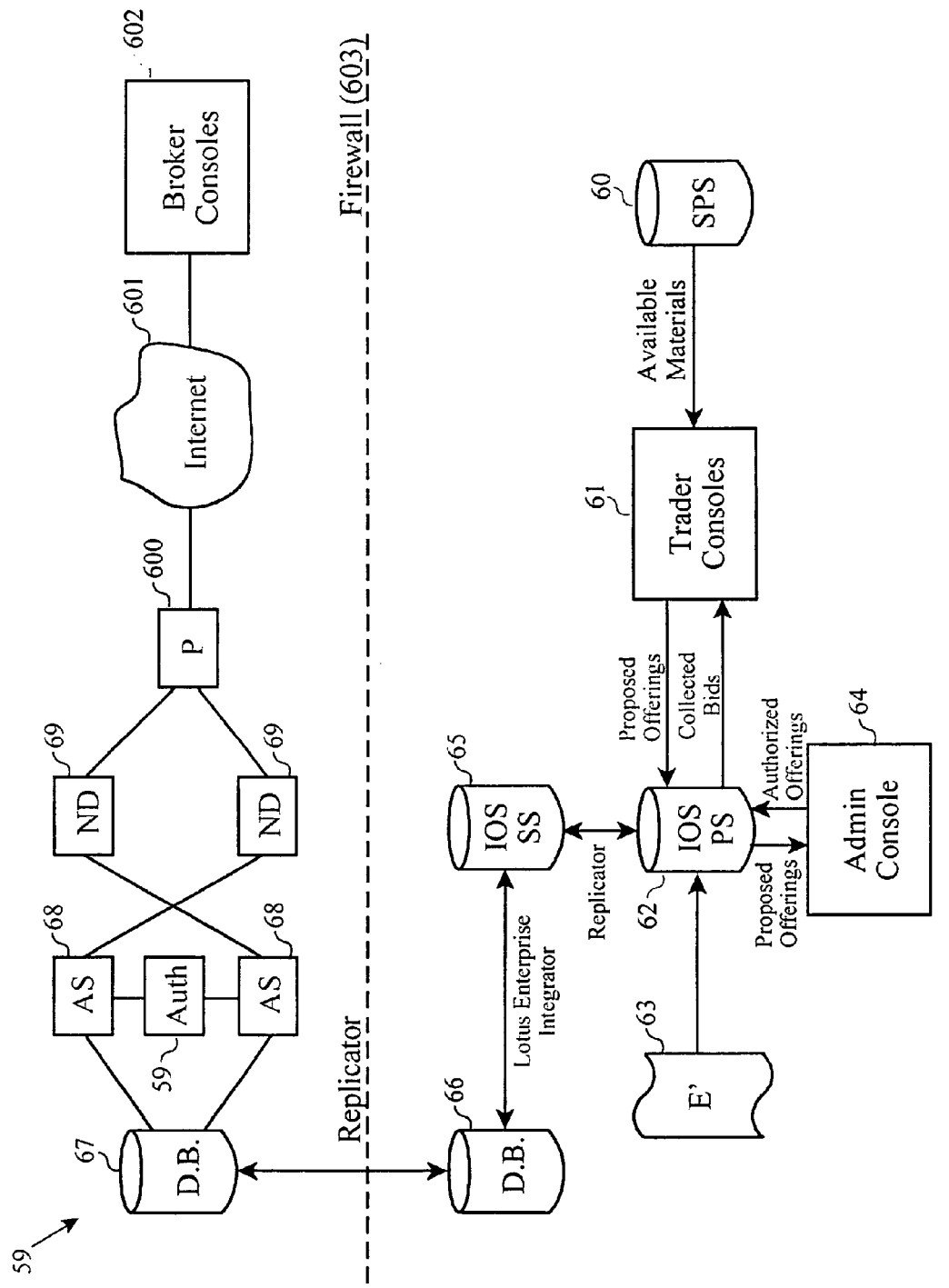
FIG. 6 sets forth the preferred embodiment of the system of the invention.

Turning to FIG. 6, the detailed organization of the system according to the preferred embodiment is shown. According to the preferred embodiment, a sales preparation system (60) comprising an IBM Lotus Notes system provides available materials list to the traders via their trader consoles (61), which are networked personal computers also running Lotus Notes applications. These available materials lists could alternatively be simple text file lists or spreadsheets, as well as data base records. Alternatively, the trader consoles (61) may be dedicated computer consoles, web browser computers, or other appropriate computer user interface devices such as wireless web browsers.

The trader console then filters the available materials list for each enhanced broker profile or entitlement schema E' (63) for the trader's brokers, and prepares proposed broker offerings to be stored in the IOS production server (62). The enhanced entitlement profile or broker profile E' (63) is also available to the IOS production server (62) for verification of the trader's proposed offerings.

An administrator may use an administrator's console (64) to query the database of the IOS production server (62) to retrieve and review a trader's proposed offerings. He may authorize all or some of the proposed offerings, and place those authorized offerings in the IOS database for replication to the IOS staging server (65).

Posting of the authorized offerings to the IOS staging server (65) is preferably done by a Lotus Notes replicator function. As both the IOS production server (62) and staging server (65) are based on IBM Lotus Notes systems in the preferred embodiment, the replicator is a natural function of Lotus Notes which is easily incorporated and maintained. An IBM Lotus Enterprise Integrator ("LEI"), formerly known as "Notes Pump", then prepares a DB2 database file (66) from the IOS staging server (65).

Further according to the preferred embodiment, all of these previously described systems and components and processes are executed and placed behind a protective data "fire wall" (603) for system security. The posted available offerings for the guest brokers are replicated to another database outside the firewall, preferably in a DB2 format (67) again. This "outside" database is available for query by at least one application server (68).

Also according to the preferred embodiment, a clustered pair of application servers (68) are used to query the outside database (67) for available offerings for brokers. The application servers are provided requests from the brokers via network dispatchers (69). The network dispatchers (69) receive broker requests for offerings by a proxy server (600). Thus, the guest brokers may use their broker consoles (602), such as web browser personal computers or wireless web browsers, to query the outside database (67) via a computer network (601) such as the Internet.

The network dispatchers provide balanced loading to the application servers (68), and they provide for redirection of requests to one of the application servers should the other application server experience a failure.

According to the preferred embodiment, the application servers (68) are web server hardware platforms, such as IBM RS6000 computers running the IBM AIX operating system, accompanied by the IBM WebSphere product. Java servlets are used to interact with the broker console computers (602), which could be alternately realized in such technology as Microsoft's Active Server Pages or Java server pages.

According to the preferred embodiment, the application servers are provided with communications capability to an authentication server (57) which may include lists of brokers and passwords against which broker log-in attempts may be validated.

Thus, the system and methods disclosed including the preferred embodiment provide a capability to prepare offerings for guest brokers from traders such that the offerings contain only the information necessary to convey a sample offering to a broker for product or service for which he is entitled to view but not bid. The preferred embodiment provides a robust and secure architecture to insure that product offerings are made available only to entitled brokers, and that system failure will not result in loss of availability of offering and bidding collection services.

Figure 7:
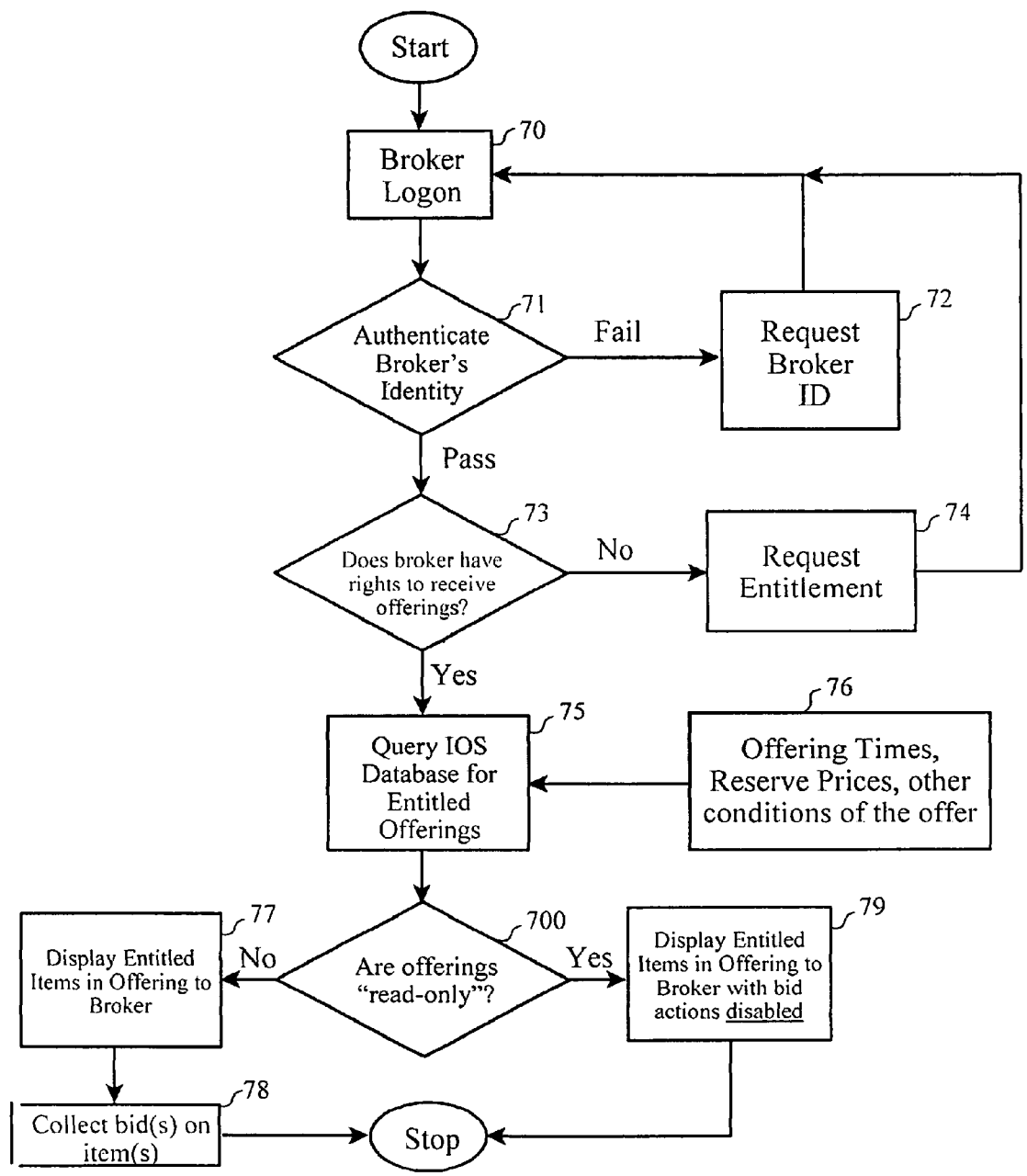
FIG. 7 illustrates the logical flow of the process of broker offer presentations, normal bid collection, and read-only offer presentations.

Turning to FIG. 7, the logical flow of the process followed by a broker and a system is shown. According to the preferred embodiment, the broker first logs on to the system (70) followed by an authentication of his log on (71). If this authentication fails, he may request a broker ID (72) which will be established for him.

If his authentication passes, then a check for his entitlements (73) may be made. If he is not currently entitled to receive any offerings, he may request an entitlement (74), according to the preferred embodiment.

Otherwise, the IOS database is queried for offerings for materials or services to which the broker is entitled (75). Times available for open bidding, reserved prices, and other related general parameters to offerings (76) may be consulted prior to presenting offerings to a broker in order to avoid presenting offerings which are already expired or closed. Each offering provided to the broker may include a plurality of materials, each material being characterized by a location-category parameter pair which matches a location-category definition in the broker's profile matrix.

Then, for all items to which the broker is entitled to view and bid (700), the entitled offerings are displayed (77) to the broker so that he may review and respond to the offerings. Those bids are then collected (78) and stored for later review by the trader using the trader console, as described in the related application.

However, for those items to which he is entitled to view information but restricted from bidding (700), the information (or a subset of the information) regarding the items will be displayed (79) with all bidding actions disabled or with no bidding actions given.

For example, in the preferred embodiment, a web page including a place bid button or icon is sent to the bidder including the information about the products to which he is entitled to bid normally (77). If the bidder decides to place a bid, he may click on the bid button, which will provide him with a bid form to complete with bid price and quantity. However, for items which a bidder is only allowed to read as a guest, the bid button is either disabled ("grayed out") and provided with an informational message such as "Sorry, you are not allowed to bid on this item at this time", or the bid button is removed from the web page (79) entirely.

It will be understood by those skilled in the art and from the foregoing description that various modifications and changes may be made in the preferred embodiment of the present invention without departing from its spirit and scope. It is intended that this description is for purposes of illustration only and should not be construed in a limiting sense. The scope of this invention should be defined by the following claims.

What is claimed is:

1. A method for providing read-only guest user access in a web based auction comprising the steps of:

in a first tier of an offering and bidding process provided to users by an interactive offer server computer, the interactive offer server computer notifying one or more traders via one or more trader console computers of available products, services, or both products and services from an offering party through the interactive offer server computer;

the interactive offer server computer in a second tier of the said offering and bidding process, communicating offerings from the one or more trader console computers to one or more broker parties via one or more broker console computers to resell the available products, services, or both products and services, wherein each of the one or more brokers are associated with a trader party;

the interactive offer server computer in a third tier of the offering and bidding process, receiving from one or more of the one or more broker parties via the one or more broker console computers bids to purchase the available products, services, or both products and services through the trader;

the interactive offer server computer accessing a reseller master agreement in a computer-readable record for each of the one or more broker parties entitling a subset of the available said products, services or both products and services on which each of the one or more broker parties are allowed to bid, the subset being authorized for subsequent resale by each of the one or more broker parties to one or more end users, the interactive offer server computer preparing and presenting one or more entitled offerings to a guest user of the offering and bidding process according to a guest profile, wherein the presenting of offerings comprising presenting to the guest user only the one or more entitled offerings for which the guest user is allowed to view information according to the guest profile and restricting display to the guest user of offerings to which the guest user is not entitled.

2. The method as set forth in claim 1 wherein the guest profile comprises one or more item category parameters.

3. The method as set forth in claim 1 wherein the guest profile comprises one or more guest location parameters.

4. The method as set forth in claim 2 wherein the step of preparing the one or more entitled offerings comprises removing one or more items from an available items list which are unmatched by at least one or more category parameters within the guest profile to produce a minimized list of items for which the guest is entitled to receive offerings.

5. The method as set forth in claim 3 wherein the step of preparing the one or more entitled offerings comprises removing items from an available items list which are unmatched by at least one or more guest location parameters produce a minimized list of items for which the guest is entitled to receive offerings.

6. The method as set forth in claim 1 wherein the step of presenting comprises displaying in a web browser user interface.

7. The method as set forth in claim 1 further comprising the step of the interactive offer server computer disabling and restricting bid attempts from the guest user for items which are indicated as read-only in the guest profile.

8. The method as set forth in claim 1 further comprising the step of the interactive offer server computer enabling bid attempts from the guest user for items which are indicated as entitled in the guest profile.

\* \* \* \* \*